US011064218B2

(12) United States Patent
Lee et al.

(10) Patent No.: US 11,064,218 B2
(45) Date of Patent: Jul. 13, 2021

(54) METHOD AND APPARATUS FOR ENCODING/DECODING IMAGE FOR VIRTUAL VIEW SYNTHESIS

(71) Applicants: ELECTRONICS AND TELECOMMUNICATIONS RESEARCH INSTITUTE, Daejeon (KR); Poznan University of Technology, Poznan (PL)

(72) Inventors: Gwang Soon Lee, Daejeon (KR); Jun Young Jeong, Seoul (KR); Hong Chang Shin, Daejeon (KR); Kug Jin Yun, Daejeon (KR); Marek Domanski, Poznan (PL); Olgierd Stankiewicz, Poznan (PL); Dawid Mieloch, Poznan (PL); Adrian Dziembowski, Poznan (PL); Adam Grzelka, Poznan (PL); Jakub Stankowski, Poznan (PL)

(73) Assignees: Electronics and Telecommunications Research Institute, Daejeon (KR); Poznan University of Technology, Poznan (PL)

( * ) Notice: Subject to any disclaimer, the term of this patent is extended or adjusted under 35 U.S.C. 154(b) by 0 days.

(21) Appl. No.: 16/823,663

(22) Filed: Mar. 19, 2020

(65) Prior Publication Data
US 2021/0006831 A1 Jan. 7, 2021

(30) Foreign Application Priority Data

Mar. 19, 2019 (KR) ........................ 10-2019-0031332
Mar. 19, 2020 (KR) ........................ 10-2020-0033909

(51) Int. Cl.
*H04N 19/597* (2014.01)
*H04N 19/176* (2014.01)
(Continued)

(52) U.S. Cl.
CPC ......... *H04N 19/597* (2014.11); *H04N 13/161* (2018.05); *H04N 13/178* (2018.05);
(Continued)

(58) Field of Classification Search
None
See application file for complete search history.

(56) References Cited

U.S. PATENT DOCUMENTS 9,124,863 B2     9/2015  Shin et al.
9,214,040 B2 *  12/2015  Smolic .................. H04N 19/86
(Continued)

FOREIGN PATENT DOCUMENTS

KR    10-2019-0010650 A    1/2019
KR       10-1960315 B1    3/2019

OTHER PUBLICATIONS

Domański, Marek et al., "Technical Description of Poznan University of Technology proposal for Call on 3D Video Coding Technology", International Organisation for Standardisation Organisation Internationale De Normalisation ISO/IEC JTC1/SC29/WG11 Coding of Moving Pictures and Audio, MPEG2011/M22697, Geneva, Switzerland, Nov. 2011 (29 pages in English).
(Continued)

*Primary Examiner* — Christopher Braniff
(74) *Attorney, Agent, or Firm* — NSIP Law

(57) ABSTRACT

Disclosed herein is an image encoding/decoding method and apparatus for virtual view synthesis. The image decoding for virtual view synthesis may include decoding texture information and depth information of at least one or more basic view images and at least one or more additional view images from a bit stream and synthesizing a virtual view on the basis of the texture information and the depth information, wherein the basic view image and the additional view image comprise a non-empty region and an empty region, and
(Continued)

wherein the synthesizing of the virtual view comprises determining the non-empty region through a specific value in the depth information and a threshold and synthesizing the virtual view by using the determined non-empty region.

11 Claims, 12 Drawing Sheets

(51) Int. Cl.
    *H04N 19/167*     (2014.01)
    *H04N 13/161*     (2018.01)
    *H04N 13/178*     (2018.01)
    *H04N 13/00*     (2018.01)

(52) U.S. Cl.
    CPC ......... *H04N 19/167* (2014.11); *H04N 19/176* (2014.11); *H04N 2013/0081* (2013.01); *H04N 2013/0088* (2013.01)

(56) References Cited

U.S. PATENT DOCUMENTS

2013/0100245 A1\*   4/2013   Lee ..................... H04N 19/597
                                                348/43
2016/0381374 A1     12/2016   Bang et al.

OTHER PUBLICATIONS

"Call for Proposals on 3DoF+ Visual", International Organisation for Standardisation Organisation Internationale De Normalisation ISO/IEC JTC1/SC29/WG11 Coding of Moving Pictures and Audio, MPEG/N18145, Marrakesh, Morocco, Nov. 2011 (18 pages in English).

\* cited by examiner

METHOD AND APPARATUS FOR ENCODING/DECODING IMAGE FOR VIRTUAL VIEW SYNTHESIS

CROSS REFERENCE TO RELATED APPLICATION

The present application claims priority to KR10-2019-0031332, filed 2019 Mar. 19, and KR10-2020-0033909, filed 2020 Mar. 19, the entire contents of which are incorporated herein for all purposes by this reference.

BACKGROUND

Field

The present invention relates to an image encoding/decoding method and apparatus for virtual view synthesis. Particularly, the present invention relates to an image encoding/decoding method and apparatus for virtual view synthesis for generating a basic view image and a supplementary view image by using an input image and for enhancing an encoding efficiency.

Description of Related Art

Virtual reality service evolves to maximize senses of immersion and realism by generating full 360-degree video in realistic or CG (Computer Graphics) format and reproducing the video on an HMD (Head Mounted Display) that is a personal VR unit.

It is currently known that 6 DoF (Degrees of Freedom) needs to be reproduced in order to play a natural and highly immersive full 360-degree video through an HMD. In other words, an image needs to be reproduced through an HMD screen so that it can be viewed by a viewer moving in six directions including (1) the horizontal movement, (2) the vertical rotation, (3) the vertical movement and (4) the horizontal rotation. As of now, an omnidirectional video plays a realistic image obtained by a camera has 3 DoF. Since such a video reproduces movements focusing on (2) vertical rotation and (4) horizontal rotation, no image thus provided can be gazed by a viewer in a horizontal movement and a vertical movement.

The MPEG standardization group defines immersive media as media for maximizing the sense of immersion through the support of 6 DoF. The MPEG standardization group is working on necessary standards for efficient encoding and transmission of immersive videos in stages ["Proposed Draft 1.0 of TR: Technical Report on Architectures for Immersive Media", ISO/IEC JTC1/SC29/WG11/w41907, Macau, CN—October 2017]. As the next stage of 3DoF, which is the most basic immersive video, 3DoF+ is an immersive video that can reproduce motion parallax in an environment where a viewer is seated. Standardization will proceed until further stages like Omnidirectional 6DoF providing the corresponding motion parallax to a viewer's walking a few steps and 6DoF providing complete motion parallax along with a free movement.

While the immersive video is a technology of using a multiview omnidirectional video (ERP (Equi-Rectangular Projection) format, cubemap format, etc.), the windowed-6DoF is another technology of providing motion parallax through a singleview window by using a multiview monoscopic video (HD, UHD, etc.). The latter technology is similar to the conventional multiview video technology with horizontal/vertical parallax.

SUMMARY

A technical problem of the present invention is to provide an image encoding/decoding method and apparatus for virtual view synthesis.

Another technical problem of the present invention is to provide an image encoding/decoding method and apparatus for virtual view synthesis, where an input view is synthesized as a basic view and a supplementary view.

Another technical problem of the present invention is to provide an image encoding/decoding method and apparatus for virtual view synthesis with enhanced encoding efficiency by using a threshold for a depth value of a supplementary view.

The technical objects of the present invention are not limited to the above-mentioned technical objects, and other technical objects that are not mentioned will be clearly understood by those skilled in the art through the following descriptions.

An image encoding method for virtual view synthesis according to an embodiment of the present invention may generating at least one or more basic view images and at least one or more supplementary view images by using input images including at least one or more view images, encoding texture information and depth information of the basic view images and the supplementary view images, and sending a threshold. The sum of the number of the basic view images and the number of the supplementary view images may be less than the number of the input images. The basic view images and the supplementary view images may include a non-empty region indicating a region that is to be used for virtual view synthesis at a decoding step and an empty region indicating a region that is not to be used for virtual view synthesis at the decoding step. The depth information of either the basic view images or the supplementary view images may include a specific value for indicating the empty region and the non-empty region. The threshold may be used for determining the empty region and the non-empty region at the decoding step.

In the image encoding method for virtual view synthesis, the non-empty region and the empty region may be divided in CUs (Coding Units).

In the image encoding method for virtual view synthesis, the supplementary view images may be seen only in view images excluding the basic view image or may include an occluded region of other view images including the basic view image.

An image decoding method for virtual view synthesis according to another embodiment of the present invention may include decoding texture information and depth information of at least one basic view image and at least one supplementary view image from a bit stream and synthesizing a virtual view on the basis of the texture information and the depth information. The basic view image and the supplementary view image may include a non-empty region and an empty region. The synthesizing of the virtual view may include determining the non-empty region through a specific value and a threshold in the depth information and synthesizing the virtual view by using the determined non-empty region.

In the image decoding method for virtual view synthesis, the specific value may be used for indicating the empty region.

In the image decoding method for virtual view synthesis, the threshold may be used for judging the empty region and the non-empty region.

In the image decoding method for virtual view synthesis, when a depth value corresponding to a pixel is equal to or greater than the threshold, the pixel may be judged as a non-empty region. When a depth value corresponding to the pixel is less than the threshold, the pixel may be judged as an empty region.

In the image decoding method for virtual view synthesis, the synthesizing of virtual view may be performed by using the texture information of the basic view image, the depth information of the basic view image and the non-empty region of the supplementary view image.

In the image decoding method for virtual view synthesis, the synthesizing of virtual view may include dividing the basic view images and the supplementary view images into predetermined groups and performing synthesis in each of the groups according to an order of priority after prioritizing the groups.

In an image encoding apparatus for virtual view synthesis including one or more processors and one or more memory devices according to another embodiment of the present invention, the one or more processors may execute one or more commands of a program for virtual view synthesis stored in the one or more memory devices. The one or more memory devices may store the program for virtual view synthesis. The one or more commands may include generating at least one basic view image and at least one supplementary view image by using an input image including at least one view images, encoding texture information and depth information of the basic view image and the supplementary view image, and sending a threshold. The sum of the number of the basic view images and the number of the supplementary view images may be less than the number of the input images. The basic view images and the supplementary view images may include a non-empty region indicating a region that is to be used for virtual view synthesis at a decoding step and an empty region indicating a region that is not to be used for virtual view synthesis at the decoding step. The depth information of either the basic view images or the supplementary view images may include a specific value for indicating the empty region and the non-empty region. The threshold may be used for determining the empty region and the non-empty region at the decoding step.

In the image encoding apparatus for virtual view synthesis, the non-empty region and the empty region may be divided in CUs (Coding Units).

In the image encoding apparatus for virtual view synthesis, the supplementary view images may be seen only in view images excluding the basic view image or may include an occluded region of other view images including the basic view image.

In an image decoding apparatus for virtual view synthesis including one or more processors and one or more memory devices according to another embodiment of the present invention, the one or more processors may execute one or more commands of a program for virtual view synthesis stored in the one or more memory devices. The one or more memory devices may store the program for virtual view synthesis. The one or more commands may include decoding texture information and depth information of at least one basic view image and at least one supplementary view image from a bit stream and synthesizing a virtual view on the basis of the texture information and the depth information. The basic view image and the supplementary view image may include a non-empty region and an empty region. The synthesizing of the virtual view may include determining the non-empty region through a specific value and a threshold in the depth information and synthesizing the virtual view by using the determined non-empty region.

In the image decoding apparatus for virtual view synthesis, the specific value may be used for indicating the empty region.

In the image decoding apparatus for virtual view synthesis, the threshold may be used for judging the empty region and the non-empty region.

In the image decoding apparatus for virtual view synthesis, when a depth value corresponding to a pixel is equal to or greater than the threshold, the pixel may be judged as a non-empty region. When a depth value corresponding to the pixel is less than the threshold, the pixel may be judged as an empty region.

In the image decoding apparatus for virtual view synthesis, the synthesizing of virtual view may be performed by using the texture information of the basic view image, the depth information of the basic view image and the non-empty region of the supplementary view image.

In the image decoding apparatus for virtual view synthesis, the synthesizing of virtual view may include dividing the basic view images and the supplementary view images into predetermined groups and performing synthesis in each of the groups according to an order of priority after prioritizing the groups.

The features briefly summarized above with respect to the present invention are merely exemplary aspects of the detailed description below of the present invention, and do not limit the scope of the present invention.

DETAILED DESCRIPTION

Figure 1:
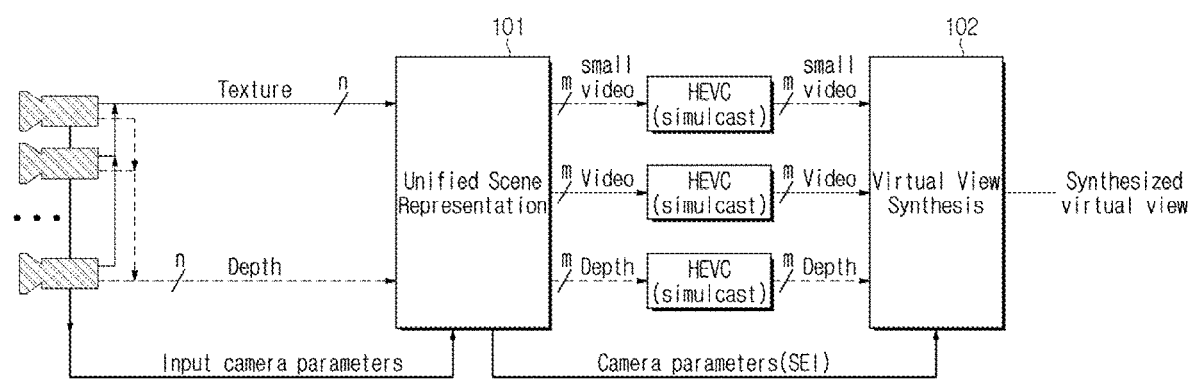
FIG. 1 is a view for explaining a method of synthesizing virtual view, in accordance with an embodiment of the present invention.

Hereinafter, embodiments of the present invention will be described in detail with reference to the accompanying drawings, which will be easily implemented by those skilled in the art. However, the present invention may be embodied in many different forms and is not limited to the embodiments described herein.

In the following description of the embodiments of the present invention, a detailed description of known functions and configurations incorporated herein will be omitted when it may make the subject matter of the present invention rather unclear. Parts not related to the description of the present invention in the drawings are omitted, and like parts are denoted by similar reference numerals.

In the present invention, when a component is referred to as being "connected", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present invention, the terms first, second, etc. are used only for the purpose of distinguishing one component from another, and do not limit the order or importance of components, etc. unless specifically stated otherwise. Thus, within the scope of the present invention, a first component in one embodiment may be referred to as a second component in another embodiment, and similarly a second component in one embodiment may be referred to as a first component.

In the present invention, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present invention.

In the present invention, components described in the various embodiments are not necessarily essential components, and some may be optional components. Accordingly, embodiments consisting of a subset of the components described in one embodiment are also included within the scope of the present invention. Also, embodiments that include other components in addition to the components described in the various embodiments are also included in the scope of the present invention.

Such terms as "part", "module" and "means", which are described in the present specification, mean a unit for processing at least one function or operation and may be implemented by hardware or software or a combination of hardware and software.

Hereinafter, in the present specification, texture may be used in the same meaning as color, color information, color value and view.

In addition, in the present specification, a depth value may be used in the same meaning as depth information, information on depth, and depth.

In addition, in the present specification, an input multiview may be used in the same meaning as an input view, an original view, and an original input view.

In addition, in the present specification, a view may mean an image including the view. In addition, virtual view synthesis in the present invention generates a view image in an arbitrary position by using texture information, depth information and the like. Virtual view synthesis at an encoding step may mean generating basic view images and supplementary view images by using an input view image. Virtual view synthesis at a decoding step may mean generating view images in every watching position of a viewer by using basic view images and supplementary view images.

According to an embodiment of the present invention, an input multiview image may be rearranged by a representation consisting of a multiplicity of videos on the basis of HEVC (High Efficiency Video Coding).

Hereinafter, embodiments of the present invention will be described with reference to the accompanying drawings.

FIG. 1 is a view for explaining a method of synthesizing virtual view, in accordance with an embodiment of the present invention.

Referring to FIG. 1, for synthesis of a virtual view according to an embodiment of the present invention, USR (Unified Scene Representation) step 101 and virtual view synthesis step 102 may be performed. In consequence, a synthesized virtual view may be output. Here, texture and depth values of view images, which are generated by performing USR, may be encoded and decoded respectively. Encoding/decoding may be performed by using codes like HEVC and VVC but is not limited thereto.

According to a synthesizing method of virtual view illustrated in FIG. 1, inter-view redundancy in input multiview representation may be reduced. For example, an input multiview image may consist of plan (for example, rectangular) views with many redundant regions between them. For another example, an input multiview representation may consist of full 360-degree images. An input image including an input multiview image may include a texture value and a depth value.

Hereinafter, a step 101 of implementing USR in FIG. 1 will be described.

According to an embodiment of the present invention, USR may receive a multiplicity of input view images with many redundant regions between views and remove such redundant regions between views by using an image synthesis technique.

As a result of removing a redundant region between views, one or more basic view images and one or more supplementary view images, which are seen only in each view position or include an occluded region in a different view position, may be output.

Accordingly, the sum of the number of basic view images and the number of supplementary view images, which are output, may be less than the number of input view images. Each view may consist of texture information and depth information.

Meanwhile, USR may mean pruning, and an output view image may mean a pruned video.

Hereinafter, the principle of USR in FIG. 2 will be described in detail.

Figure 2:
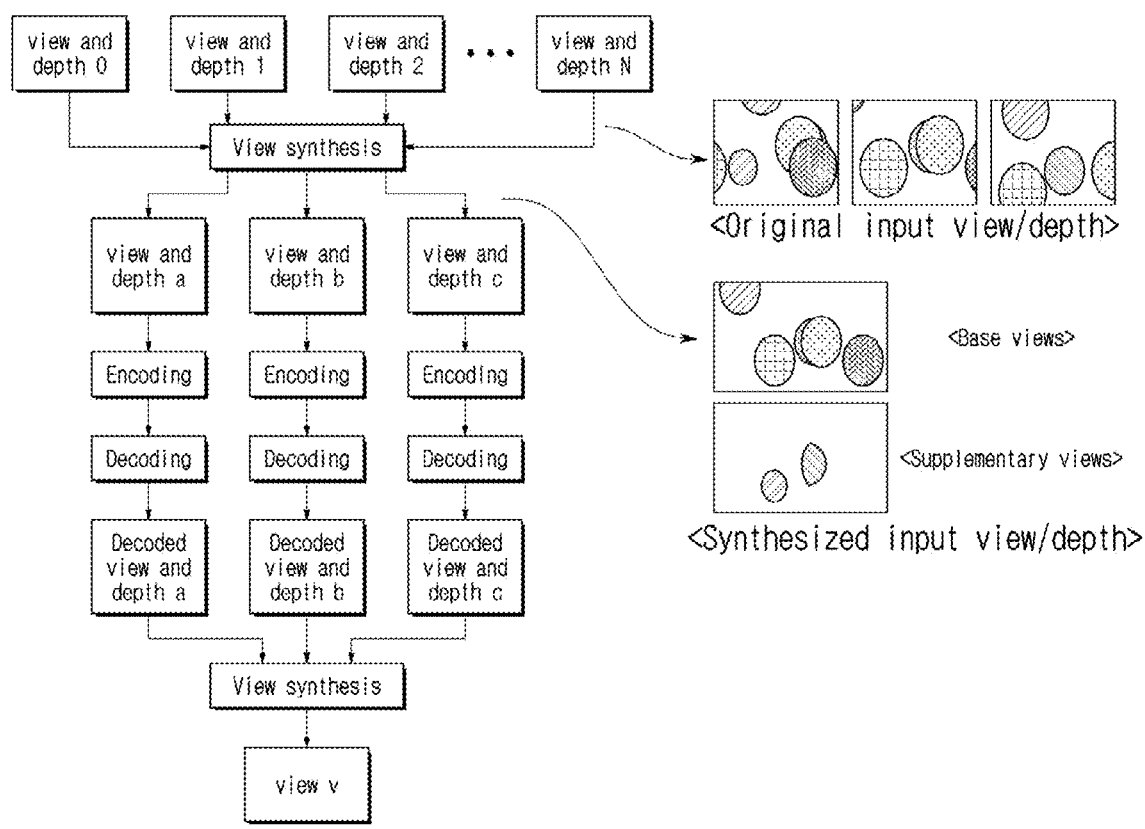
FIG. 2 is a view for explaining the principle of USR, in accordance with an embodiment of the present invention.

FIG. 2 is a view for explaining the principle of USR, in accordance with an embodiment of the present invention.

One scene may be represented by using at least one or more basic views and at least one or more supplementary views. The supplementary view images may include information, which is seen only in each view image position excluding the basic view images, or information (for example, occluded information) that is not seen in another input view image including the basic view images.

For example, referring to FIG. 2, before a step of encoding/decoding an image for view synthesis is performed, as N original input views are used, at least one or more basic views and at least one or more additional views may be generated. Herein, the number of at least one or more basic views and at least one or more additional views may be less than the number (N) of the original input views. Here, N may be a positive integer that is 1 and above.

In other words, as texture information and depth information of a basic view image and a additional view image may be generated by using texture information and depth information of many original input view images, the number of encoders/decoders used for transmitting an image may be smaller than when an original input view image is transmitted as it is.

Here, additional views may be located in the same view as a basic view. Additional views located in the same view as a basic view may be referred to as central additional views.

In addition, additional views may be located in a different view from a basic view. For example, additional views may be located on the left or right of a basic view. Herein, additional views located in a different view from the basic view may be referred to as non-central additional views.

The position of a basic view and a additional view may be the same as the position of an original input view. Alternatively, they may be generated by a view synthesis process in a different position from the position of an original input view.

First, points of an original input view (real view) may be projected to a basic view or may be selected with no processing. Here, unlike a conventional virtual view synthesis method omitting points indicating an occluded region, such points indicating an occluded region may be stored in a central additional view in an embodiment of the present invention.

Here, a basic view and one or more additional views may have a texture value and a depth value respectively. In addition, a basic view may be a general virtual view and include only information of an original input view image.

A first additional view may include points that are occluded in a basic view. A second additional view may include points that are occluded in a basic view and a first additional view. In other words, an i-th additional view may occluded information of the (i−1)-th additional view. Here, i may be a positive integer that is equal to or greater than 2.

Non-central additional views may be generated in the following three steps. At a first step, additional views may be synthesized by using information of every original input view. At a second step, a basic view may be projected to the additional views. At a third step, for all the points of the additional views, whether or not the points are synthesized also in a basic view may be checked, and points that are synthesized also in the basic view may be removed from the additional views.

In other words, as points of a basic view and points of additional views are compared through image synthesis, points that are judged to be generated from a spatially same position may be removed. On the other hand, when points are judged to be generated from spatially different positions, they may be seen only in each view position or be regarded as an occluded region. Here, removed points may correspond to an empty region, and other points that are seen only in each view position or are regarded an occluded region may correspond to a non-empty region. Here, points may be pixels of view images or may be obtained by inversely projecting the pixels to 3D space.

As most regions of additional views are empty regions, inpainting may not be performed in the corresponding regions.

In addition, the angel view of a base camera may be larger than angle views of input cameras. Accordingly, some regions adjacent to the boundary of a basic view may be empty regions. In other words, some regions adjacent to the boundary of a basic view may not be seen in an input view. In order to prevent wrong information from being used when filling the regions, extrapolation by inpainting in a basic view boundary may not be used.

Color characteristics may be different in each original view (for example, each natural multiview sequence). The color characteristics should be the same in order to generate a basic view and additional views.

Here, according to an embodiment of the present invention, a fast color correction algorithm may be used. In other words, an overall color difference between points projected in two original views may be calculated by average ratios (average for an entire image) between a color element projected in a first view and a color element projected in a second view. The algorithm may be implemented for all the color elements (for example, Y, CB, CR).

In order to make colors of points projected in an original view i the same, color element values projected in the view i may be determined as a product of average ratios between the original view i and a reference view. Here, a reference view may mean a view obtained by a real camera closest to a virtual camera.

In the case of an inconsistent sequence between views of a depth map, an additional step for unifying depth values may be necessary before a basic view and additional views are extracted. Here, cross-view synthesis may be performed as an additional step. Cross-view synthesis may be performed to project all the N depth maps to each of N view positions. In other words, to enhance the consistency of depth values in every view position, depth maps in N view positions excluding each view position may be projected to each view position. Then, a list of depth values, which are projected on N input depth maps for all the points of depth maps, may be created. Here, N may be a value that is equal to or less than the number of input views. In other words, the consistency of depth maps between views may be enhanced, when a list of N depth values projected to each view position is arranged and then a distribution plot is examined to remove peripheral values and take an average value.

In this regard, as an embodiment, the following steps may be performed in the same manner for each point. Hereinafter, each numeral may mean a corresponding step.

1. Arrange all the projected depth values in descending order.

2. If the smallest n depth values are similar (for example, those values have a smaller difference than a predefined threshold), proceed to step 6. Otherwise, proceed to step 3.

3. Remove a first (smallest) depth value from the list.

4. If the number of elements in the list is smaller than n, proceed to step 5. Otherwise, proceed to step 2.

5. Store values removed from the list, decrease n and then proceed to step 2.

6. A new depth value of an analyzed point becomes an average value of n values.

Hereinafter, positions of a basic view and additional views will be described.

A basic view should be located at the center of a multi-view camera system in order to make most objects clearly seen.

In the case of an omni-directional sequence where real cameras are arranged in a solid like a sphere, a basic view should be located at the center of the solid.

In the case of a non-omnidirectional sequence (monoscopic video sequence), a basic view should be located in the middle between the leftmost camera and the rightmost camera along a horizontal axis and to be located in the middle between the top camera and the bottom camera along a vertical axis. When a basic view is located far from a scene and a real camera along z-axis, the scene may be taken in a large angle view.

Figure 3A:
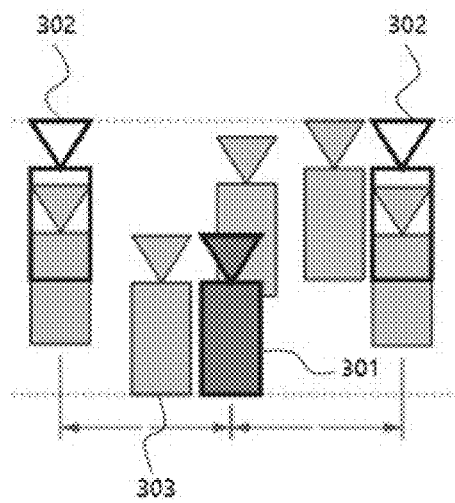
FIGS. 3A and 3B are views for explaining the positions of basic views and supplementary views, in accordance with an embodiment of the present invention.
Figure 3B:
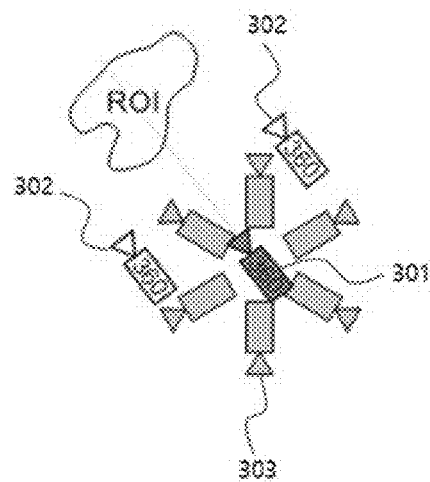

FIGS. 3A and 3B are views for explaining the positions of based views and additional views, in accordance with an embodiment of the present invention. FIG. 3A may illustrate a non-omnidirectional sequence, and FIG. 3B may illustrate an omni-directional sequence.

In FIG. 3A and FIG. 3B, 301 may represent a position of a camera showing a basic view, 302 may represent a position of a camera showing a additional view, and 303 may represent a position of a camera showing an input view.

According to an embodiment of the present invention, there may be no limitation in the number and arrangement of additional views.

Referring to FIG. 3A, in the case of a non-omnidirectional sequence, two central additional views should be in the same view as a basic view. Left and right additional views should be located in the positions of leftmost and rightmost real cameras respectively. In addition, the views should be moved to a closest real camera within a scene along the z-axis.

Referring to FIG. 3B, in the case of an omni-directional sequence where left/right dependency is not defined, a position of ROI (Region Of Interest) should be randomly selected before additional views are located. When a line connecting a basic view and an ROI in a selected position is assumed as the z-axis, positions of left and right views may be identified.

In the case of an omni-directional sequence, a basic view and additional views should be omni-directional (360°× 180°). In the case of a non-omnidirectional sequence, since information of an entire scene should be included, angle views of base and supplementary cameras should be increased. Since the occurrence of perspective artifacts should be avoided at this step, the focal length of a virtual camera capturing a basic view and additional views may be equal or similar to that of a real camera. Accordingly, angle views of base and supplementary cameras may be increased by moving the major points of the cameras with no increase in the resolution of the angle views and no change in the focal lengths of the cameras.

During a virtual view synthesis process, crack artifacts (for example, 1 pixel width hole) for a basic view and additional views may occur. A crack for additional views may be marked as a region with a much smaller depth value compared to a neighboring region or as a region with no information. A crack artifact for a basic view may be marked by pixels that have a smaller depth value than neighboring pixels within additional views.

As the crack artifact may reduce synthesis quality and encoding efficiency, it needs to be removed.

Accordingly, an embodiment of the present invention, a depth value of each pixel of a additional view may be compared with depth values of horizontally and vertically neighboring pixels. Here, if the depth value of two neighboring pixels is larger or smaller, the color and depth values of each pixel of a additional view may be updated by an average value of the two neighboring pixels.

Figure 4:
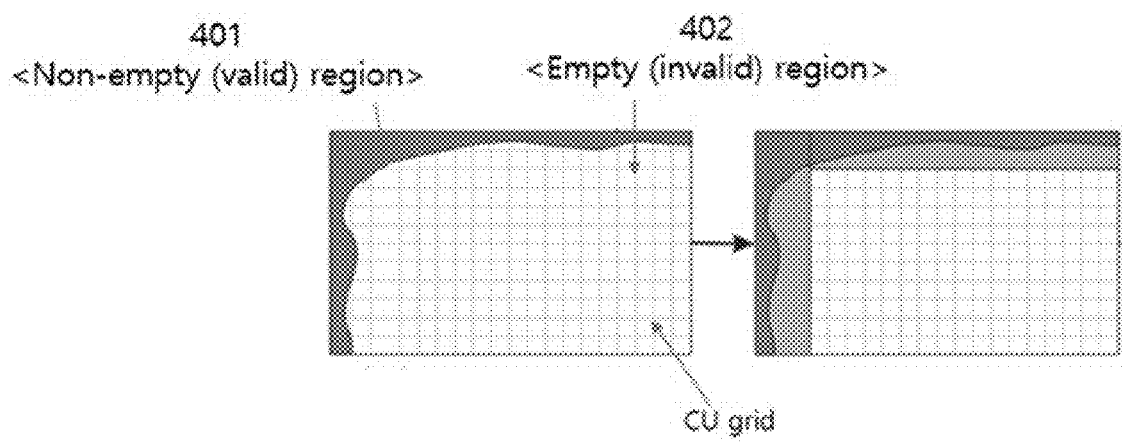
FIG. 4 is a view for explaining a method of encoding by expanding a boundary region of an empty region and a non-empty region in CU, in accordance with an embodiment of the present invention.

FIG. 4 is a view for explaining a method of encoding by expanding a boundary region of an empty region and a non-empty region in CU, in accordance with an embodiment of the present invention.

A non-empty region may mean a region that is to be used for image synthesis and rendering in a receiving unit. In addition, an empty region may mean a region that will not be used for image synthesis and rendering in a receiving unit.

The left case of FIG. 4 illustrates that a boundary between an empty region and a non-empty region exists as an arbitrary shape within a CU. In addition, The right case of FIG. 4 illustrates that a boundary between an empty region and a non-empty region is extended to a CU grid. Here, 401 represents a non-empty region, and 402 represents an empty region.

A additional view may be seen only in each view position excluding a basic view image or may include information that is not seen in a different input view image (occluded information in a basic view or another additional view). In other words, an empty region may be a region that is seen only in each view position or includes occluded information. An empty region may be a region where redundant information that is already included in a basic view or another additional view has been removed.

Here, there may be many boundaries between an empty region and a non-empty region. A boundary may have an arbitrary shape. If a boundary between an empty region and a non-empty region is horizontal and/or vertical and is located on a boundary of CU (Coding Unit), it may be encoded with a higher efficiency than when being located within a CU. Thus, according to an embodiment of the present invention, as a non-empty region is extended to a CU grid, the boundary located within CU may be reduced.

In other words, according to an embodiment of the present invention, encoding efficiency may be enhanced since a boundary between an empty region and a non-empty region is so extended as to be divided by CU unit. Meanwhile, a CU grid may be a smallest unit (for example, CB (Coding Block) performing an image encoding/decoding process. Alternatively, a CU grid may be divided into smaller units or may be extended to a set of at least one or more CBs.

An arrangement of non-empty regions in additional views may be changed over time. Accordingly, in order to enhance encoding efficiency, temporal complementation of additional views should be performed.

According to an embodiment of the present invention, the application of hierarchical GOP (Group of Picture) is assumed. In other words, all the frames except I-frame and one B-frame should refer to one previous frame and one forward frame.

Temporal complementation may be performed only for an empty pixel of B-frame. In other words, when a pixel of B-frame is a non-empty pixel (for example, there are a color value and a color), the complementation may not be performed.

In order to perform temporal complementation for all empty pixels of B-frame, it may be checked whether or not pixels arranged in the previous and forward frames are empty pixels. If the pixels of the previous and forward frames are empty pixels, the pixels of the B-frame remain to be empty pixels. If pixels of one of the two frames are empty pixels, since an encoder is assumed to use another reference, the pixels of the B-frame still remain to be empty pixels.

However, if pixels of the two frames are non-empty pixels, the pixels of the B-frame may be modified, and modified depth and color values may be copied from a collocated pixel of a basic view.

Figure 5:
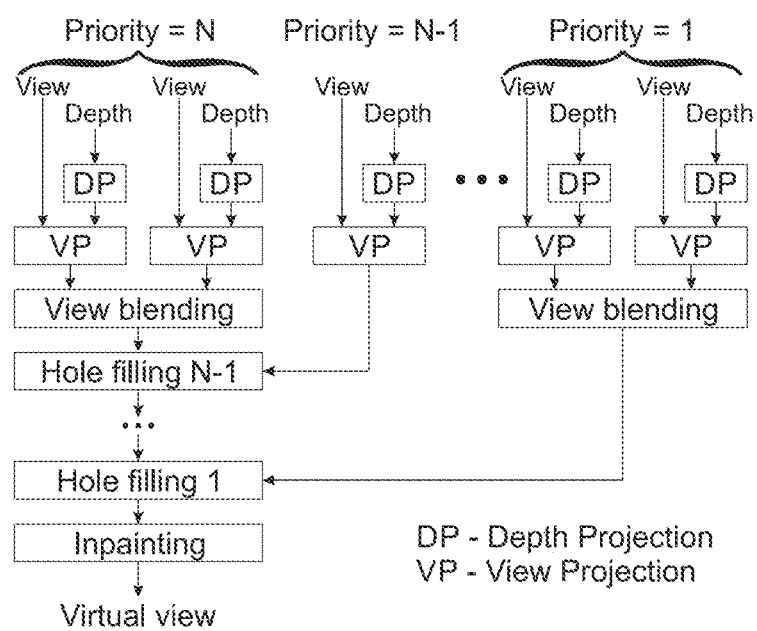
FIG. 5 is a view for explaining a virtual view synthesis method according to an embodiment of the present invention.

FIG. 5 is a view for explaining a virtual view synthesis method according to an embodiment of the present invention.

According to an embodiment of the present invention, signaling based on a depth of a point not used in view synthesis may be added. In addition, the subjective quality of a synthesized view may be improved through prioritization of input views and enhanced inpainting of omni-directional views.

A virtual view synthesis method according to an embodiment of the present invention may be an extension of a triangle-based multiview synthesis method. Referring to FIG. 5, each input view may be individually projected as a virtual view. In addition, in order to generate final virtual views, data that are projected in all the views may be merged with respect to a processing priority. In this case, a disoccluded region may not be inpainted but be filled with additional input views.

Input views with a high priority may be used for synthesizing virtual views. On the other hand, views with a relatively low priority may be used for filling a disoccluded region. After view images are divided into several groups, the groups may be prioritized. Here, a priority may be higher as a group is closer to a view position where virtual view synthesis is to be performed. After projection is made to each divided group and then view blending is performed, hole filling may be performed in order of priority. As there are many views thus obtained and the consistency among them is reduced, blurring of a synthesized image, which is caused by view blending, may be minimized.

For example, after a basic view image and additional view images are divided into predetermined groups, the groups may be prioritized. In addition, in the order of priority, virtual views may be synthesized in each of the groups.

At an inpainting step for an omni-directional view image, a transverse equirectangular projection (for example, Cassini projection) may be used for finding closest points.

Figure 6A:
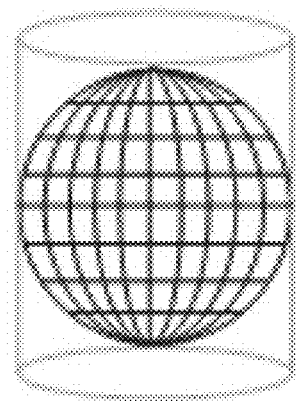
FIGS. 6A and 6B are views for explaining a cylinder used for projection in accordance with an embodiment of the present invention.
Figure 6B:
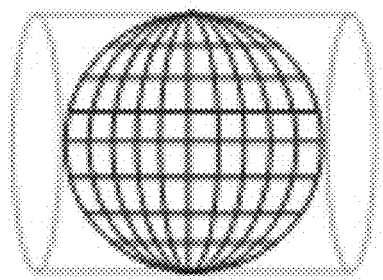

FIGS. 6A and 6B are views for explaining a cylinder used for projection in accordance with an embodiment of the present invention.

FIG. 6A illustrates a projection of a sphere to a planar image in an equirectangular projection, and FIG. 6B illustrates a projection of a sphere to a planar image in a transverse equirectangular projection.

In an equirectangular projection widely used for an omni-directional video, a sphere may be mapped to a cylinder which is in contact with the sphere at the zero-latitude point (FIG. 6A).

In addition, in a transverse equirectangular projection, since a cylinder to which a sphere is mapped rotates 90 degrees, they may be in contact with each other at the zero-longitude point (FIG. 6B).

In virtue of the above-described change of equirectangular projection, a search for a closest projection point may now be simply performed on a row of an image.

Figure 7A:
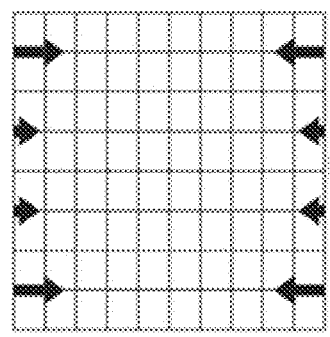
FIGS. 7A to 7C are views for explaining a fast reprojection of an equirectangular image in accordance with an embodiment of the present invention.
Figure 7B:
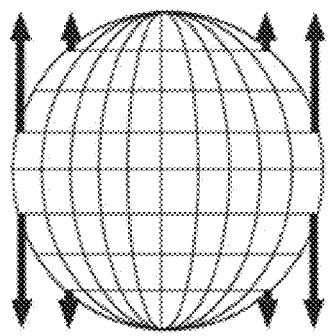
Figure 7C:
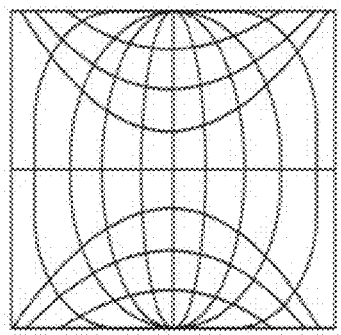

FIGS. 7A to 7C are views for explaining a fast reprojection of an equirectangular image in accordance with an embodiment of the present invention.

Black arrows shown in FIGS. 7A to 7C may indicate directions in which the sizes of a row and a column in an image change respectively.

According to an embodiment of the present invention, an equirectangular image may be quickly approximately projected as a transverse equirectangular image. First, the length of every row in a square image may be changed to correspond to the circumference of a circle (FIG. 7A). In addition, every column of the corresponding image may be extended (FIG. 7B). In addition, every column may be extended to have the same length (FIG. 7C).

Two close points in a transverse image may be used in inpainting of a disoccluded point.

For example, colors, depths and positions of two closest projected points may be used. When two points have similar depth values, the color of a disoccluded point may be an average color of two closest points based on a distance to the corresponding point. On the other hand, when a difference of depth value between two points is greater than a preset threshold, colors of additional points may be used.

Figure 8:
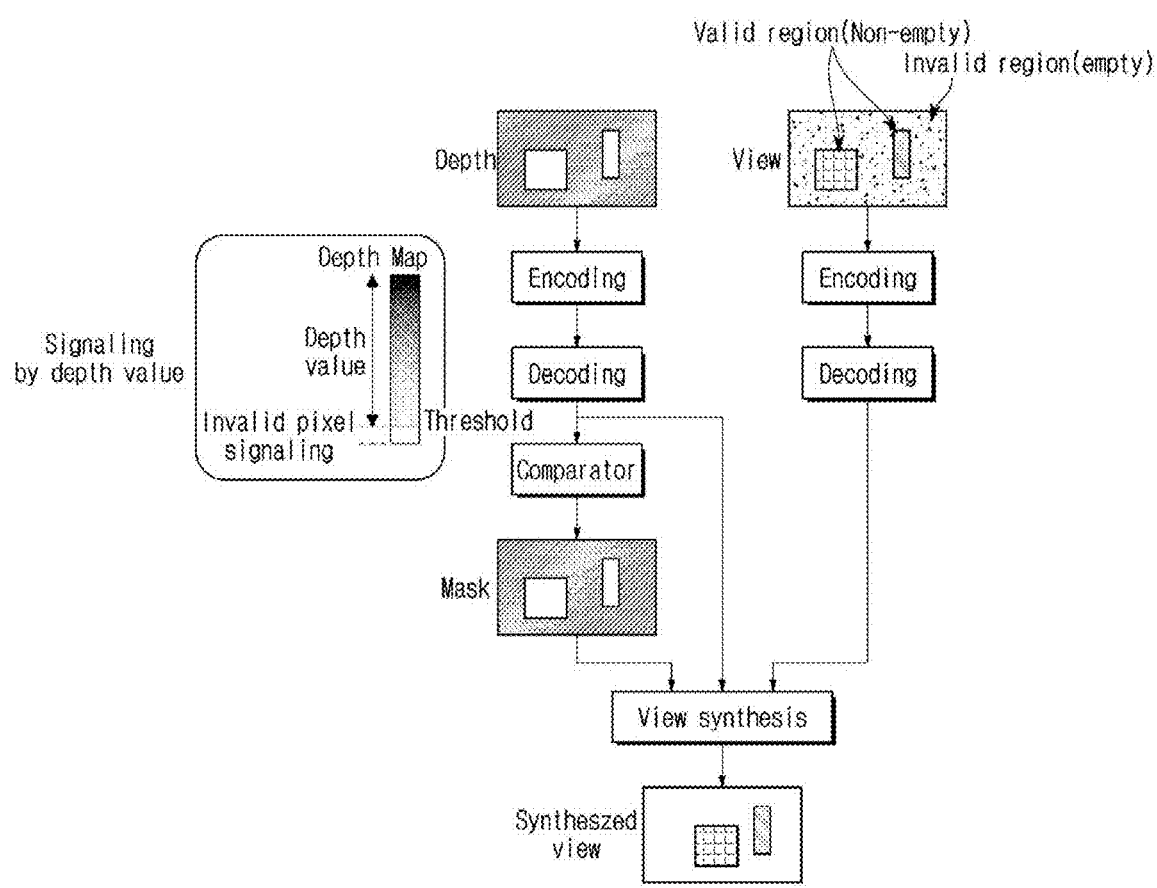
FIG. 8 is a view for explaining a method of signaling an empty region and a non-empty region in accordance with an embodiment of the present invention.

FIG. 8 is a view for explaining a method of signaling an empty region and a non-empty region in accordance with an embodiment of the present invention.

According to an embodiment of the present invention, points of views (for example, points indicating an object that can be seen in a different view), which should not be used for final view synthesis, may be marked. As points of views that should not be used for final view synthesis correspond to an empty (or invalid) region as illustrated in FIG. 4, depth values of points corresponding to an empty region before encoding may be set as a specific value (for example, 0) and then may be transmitted at a decoding stage and at a view synthesis stage.

In other words, depth information of a basic view image or a additional view image may include a specific value for indicating an empty region that will not be used for view synthesis.

Here, whether or not each view of a decoded view image will be used for view synthesis may be determined based on a mask implemented in a comparator. A comparator may determine whether or not a depth value of each pixel is within a specific range (threshold) (for example, whether or not a depth value is less than 64).

In other words, when a depth value is equal to or greater than a specific range of threshold (for example, 64), a comparator may judge it as a non-empty region. When a depth value is less than a specific range of threshold, a comparator may judge it as an empty region. Alternatively, a specific value for indicating a non-empty region may be set as a highest value (for example, 1023). In this case, if a depth value is less than a specific range of threshold (for example, 1023-64), a corresponding pixel may be judged as an empty (or invalid) region. If a depth value is equal to or greater than a specific range of threshold, a corresponding pixel may be judged as a non-empty (or valid) region. Accordingly, a non-empty region may be determined by using a specific value within a depth value (or depth information) and a threshold.

In other words, when a depth value of each pixel of a depth map in a comparator is equal to or greater than a specific threshold, it may be judged as a non-empty region and may perform a role of depth value. Thus, the corresponding pixels in a view may be used for image synthesis. On the other hand, when each pixel is smaller than a threshold, it may be judged as an empty region. In this case, the corresponding pixels in a view may not be used for image synthesis. Here, a threshold may be a preset value that is appointed in an encoder/decoder or may be value that is standardized based on metadata and is transmitted from an encoder to a decoder.

Meanwhile, a method of indicating an empty region through a specific value within a depth map may not only indicate a region that does not require image synthesis but also be used for dividing and indicating a particular object within a scene. In other words, if an object is divided within a scene, it may be used for various application services like AR (Augmented Reality).

Here, a mask determined by a threshold may mean an occupancy map, and a threshold may also be referred to as a depth occupancy threshold.

In addition, each of the pixels may be a pixel included in a additional view image.

In addition, pixels within a additional view image, which are judged as a non-empty region based on a threshold, may be used for a synthesis of virtual view together with texture information of a basic view image and depth information of a basic view image.

When the above-described method is used, a scene may be reconstructed by using a depth map and textures but without additional information.

Figure 9:
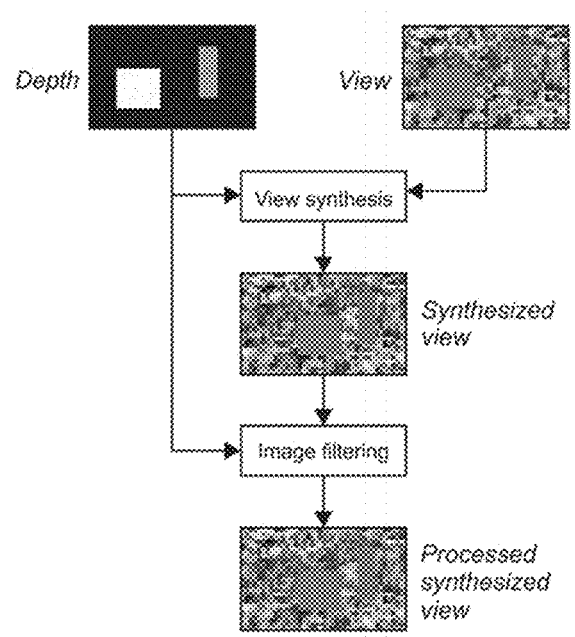
FIG. 9 is a view for explaining a method where filtering is performed in a synthesized view, in accordance with an embodiment of the present invention.

FIG. 9 is a view for explaining a method where filtering is performed in a synthesized view, in accordance with an embodiment of the present invention.

According to an embodiment of the present invention, post-processing may be performed to improve the objective quality of virtual view synthesis. Post-processing may include a filtering process.

After a view synthesis is performed, a spatial edge may be identified by using an input depth map. In other words, a region with a high gradient may be identified in a depth map. Since a sharp and unnatural edge should be removed in such a region, filtering may be performed for a synthesized view. As a result of the filtering, the sharp and unnatural edge may be blurred.

Figure 10:
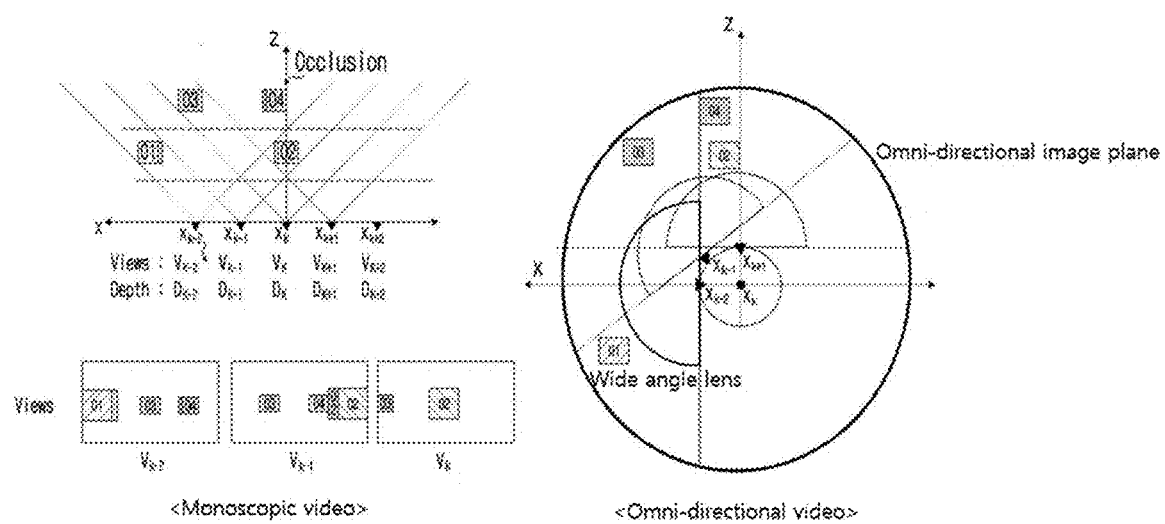
FIG. 10 is a view for explaining a concept of immersive video in accordance with an embodiment of the present invention.

FIG. 10 is a view for explaining a concept of immersive video in accordance with an embodiment of the present invention.

Referring to FIG. 10, the object 1(O1) to the object 4(O4) may mean each video region within an arbitrary scene. $V_k$, $X_k$ and $D_k$ may mean a video obtained in a camera center position (base video, reference video), a view position (camera position) and depth information in a camera center position, respectively. In order to support 6 DoF along with a viewer's movement, an immersive video may be generated by using a base video ($V_k$) seen in a center position (or central position, reference position) ($X_k$), multi position videos ($V_{k-2}$, $V_{k-1}$, . . . ) in multiview positions ($X_{k-2}$, $X_{k-1}$, . . . ), which are seen when a viewer moves, and relevant spatial information (for example, depth information and camera information). The immersive video may be transmitted to a terminal through video coding and packet multiplexing. Here, a base video and/or multi position videos may be a monoscopic video or an omni-directional video.

Accordingly, since an immersive media system should obtain, generate, transmit and represent a large immersive video consisting of multi views, a large volume of data should be effectively stored and compressed, and compatibility with the existing immersive videos (3 DoF) should also be maintained.

Meanwhile, an immersive video formatting apparatus may obtain a base video, a multi position video, and the like, and a receiving unit (not illustrated herein) may perform the operation.

Figure 11:
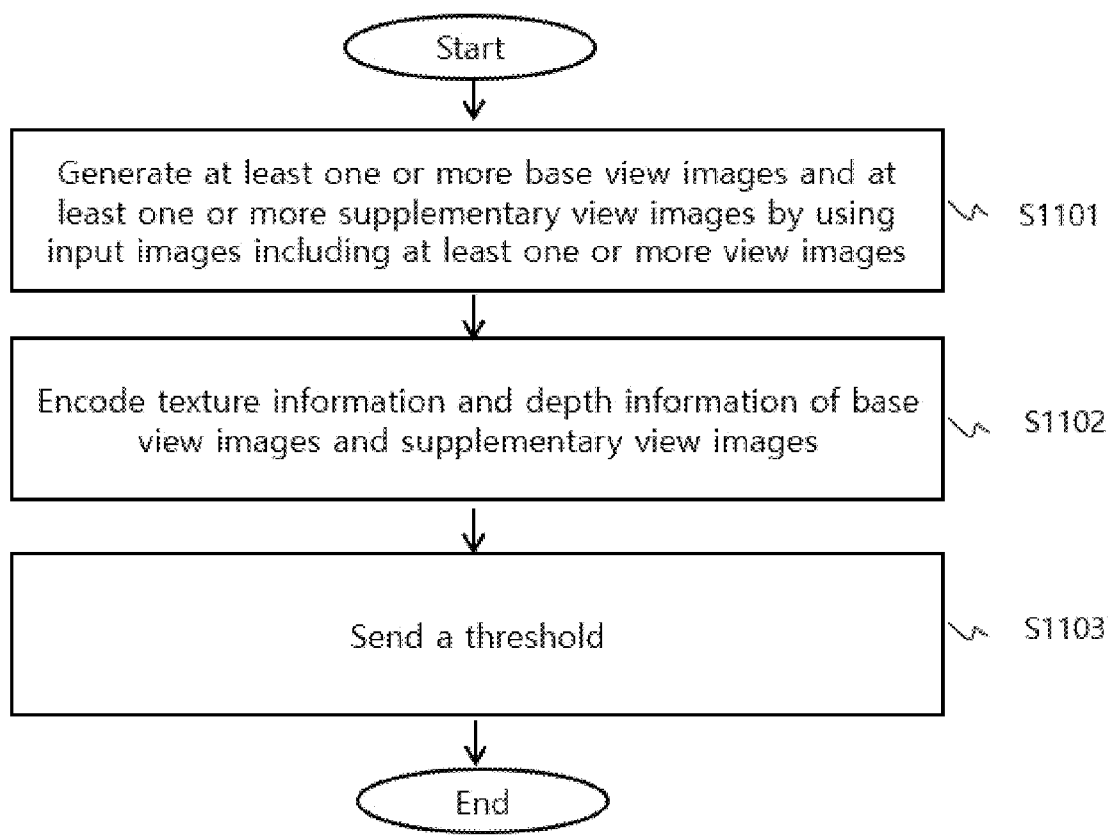
FIG. 11 is a view for explaining an image encoding method for virtual view synthesis, in accordance with an embodiment of the present invention.

FIG. 11 is a view for explaining an image encoding method for virtual view synthesis, in accordance with an embodiment of the present invention.

Referring to FIG. 11, an image encoding apparatus for virtual view synthesis may generate at least one basic view image and at least one additional view image by using an input image including at least one view image (S1101).

In addition, an image encoding apparatus for virtual view synthesis may encode texture information and depth information of a basic view image and a additional view image (S1102).

In addition, an image encoding apparatus for virtual view synthesis may send a threshold to an image decoding apparatus for virtual view synthesis through metadata (S1103).

Here, a threshold may be used for judging an empty region and a non-empty region at a decoding step.

Here, the sum of the number of basic view images and the number of additional view images may be less than the number of input views.

Meanwhile, a basic view image and a additional view image may a non-empty region indicating a region, which will be used for virtual view synthesis at a decoding step, and an empty region indicating a region, which will not be used for virtual view synthesis at a decoding step.

In addition, depth information of a basic view image or a additional view image may include a specific value for indicating an empty region and a non-empty region.

Here, a non-empty region and an empty region may be divided in CUs (Coding Units).

Meanwhile, a additional view image may be seen only in a view image excluding a basic view image or may include an occluded region of an image of a different view including a basic view.

Figure 12:
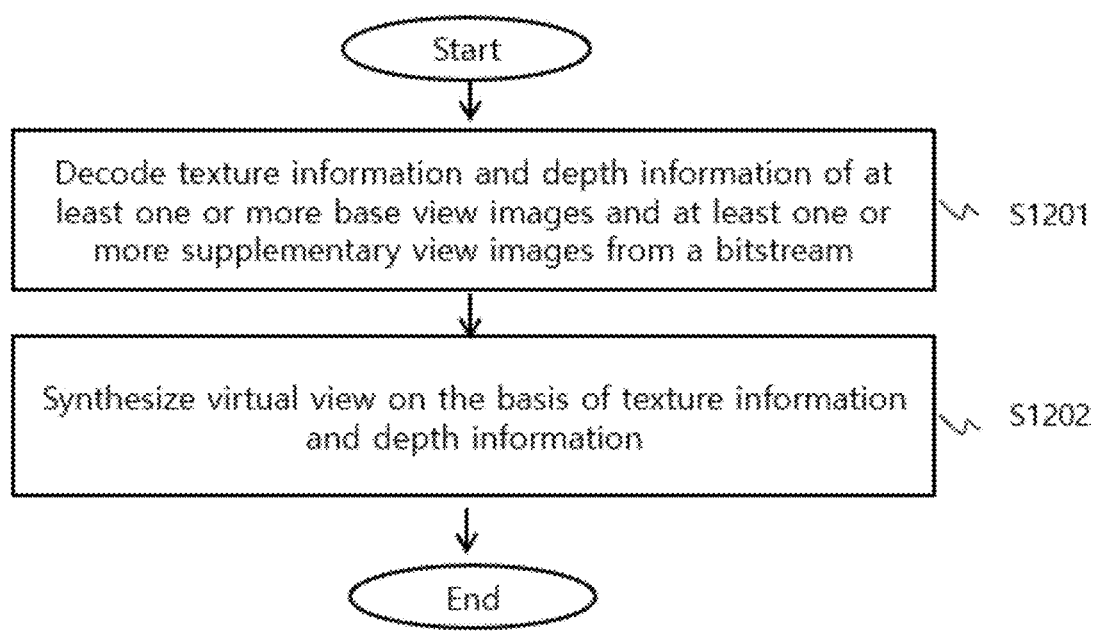
FIG. 12 is a view for explaining an image decoding method for virtual view synthesis, in accordance with an embodiment of the present invention.

FIG. 12 is a view for explaining an image decoding method for virtual view synthesis, in accordance with an embodiment of the present invention.

Referring to FIG. 12, an image decoding apparatus for virtual view synthesis may decode texture information and depth information of at least one basic view image and at least one additional view image from a bit stream (S1201). Here, a additional view image may include a non-empty region and an empty region.

In addition, based on texture information and depth information of at least one basic view image and at least one additional view image, an image decoding apparatus for virtual view synthesis may synthesize a virtual view (S1202).

Meanwhile, at the step S1202, an image decoding apparatus for virtual view synthesis and a specific value in depth information may determine a non-empty region through a threshold, which is received from an image encoding apparatus, and may synthesize a virtual view by using the non-empty region thus determined.

Here, a specific value may be used for indicating an empty region.

In addition, a threshold may be used for judging an empty region and a non-empty region.

Meanwhile, when a depth value corresponding to a pixel is equal to or greater than a threshold, the corresponding pixel may be judged as a non-empty region. When a depth value corresponding to a pixel is smaller than a threshold, the corresponding pixel may be judged as an empty region.

Meanwhile, the stop S1202 may be performed by using texture information of a basic view image, depth information of a basic view image, and a non-empty region of a additional view image.

In addition, at the step S1202, basic view images and additional view images may be divided into predetermined groups, the groups may be prioritized, and synthesis may be performed in each group according to an order of priority.

According to the present invention, an image encoding/decoding image and apparatus for virtual view synthesis may be provided.

In addition, according to the present invention, an image encoding/decoding method and apparatus for virtual view synthesis, where an input view is synthesized as a basic view and a additional view, may be provided.

In addition, according to the present invention, an image encoding/decoding method and apparatus for virtual view synthesis may be provided where the number of basic views and additional views is equal to or less than the number of input views and a non-empty region and an empty region are distinguished through a threshold, thereby enhancing encoding efficiency.

Effects obtained in the present invention are not limited to the above-mentioned effects, and other effects not mentioned above may be clearly understood by those skilled in the art from the following description.

Although the exemplary methods of the present invention are represented by a series of acts for clarity of explanation, they are not intended to limit the order in which the steps are performed, and if necessary, each step may be performed simultaneously or in a different order. In order to implement a method according to the present invention, the illustrative steps may include an additional step or exclude some steps while including the remaining steps. Alternatively, some steps may be excluded while additional steps are included.

The various embodiments of the present invention are not intended to be all-inclusive and are intended to illustrate representative aspects of the disclosure, and the features described in the various embodiments may be applied independently or in a combination of two or more.

In addition, the various embodiments of the present invention may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation.

The scope of the present invention includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

What is claimed is:

1. An image encoding method for virtual view synthesis, the method comprising:
   performing pruning for input images;
   outputting pruned view images for a basic view image, and an additional view images;
   encoding a texture image for the pruned view images;
   encoding a depth image for the pruned view images; and
   encoding information related to a threshold value,
   wherein pixels in a valid region in the texture image and the depth image are used for virtual view synthesis, and pixels in an invalid region in the texture image and the depth image are not used for virtual view synthesis,
   wherein in response to a pixel being included in the valid region, a depth value corresponding thereto is set to be equal to or greater than the threshold value, and
   wherein in response to a pixel being included in the invalid region, a depth value corresponding thereto is set to be less than the threshold value.

2. The method of claim 1,
   wherein the valid region is expanded to boundary of a block including at least one pixel in the valid region.

3. The method of claim 1,
   wherein a pruned view image for the additional view image comprises an occluded region of other view images including the basic view images.

4. An image decoding method for virtual view synthesis, the method comprising:
   decoding a texture image for basic view image and an additional view image from a bit stream;
   decoding a depth image for the basic view image and the additional view image from the bitstream; and
   synthesizing a virtual view based on the texture image and the depth image,
   wherein pixels included in a valid region in the texture image and the depth image are used for virtual view synthesis, and pixels included in an invalid region in the texture image and the depth image are not used for virtual view synthesis,
   wherein whether a pixel is include in the valid region or the invalid region is determined by comparing a depth value corresponding thereto with a threshold value, the threshold value being determined based on information decoded from the bitstream,
   wherein, in response to a depth value corresponding to a pixel is equal to or great than the threshold value, the pixel is determined to be included in the valid region, and
   wherein in response to a depth value corresponding to the pixel is less than the threshold, the pixel is determined to be included in the invalid region.

5. The method of claim 4,
   wherein, during the virtual view synthesis, a pixel in the virtual view image is reconstructed by reconstructed pixels of multiple view images.

6. The method of claim 4,
   wherein the method further comprises determining priority orders of multiple view images, and:
   wherein a weight assigning to each of the reconstructed pixels is determined based on the priority orders of the multiple view images.

7. An image encoding apparatus for virtual view synthesis comprising one or more processors and one or more memory devices,
   wherein the one or more processors execute one or more commands of a program for virtual view synthesis stored in the one or more memory devices,
   wherein the one or more memory devices store the program for virtual view synthesis,
   wherein the one or more commands comprise
   performing pruning process for input images;
   outputting pruned view images for a basic view image, and an additional view image;
   encoding a texture image for the pruned view images;
   encoding a depth image for the pruned view images; and
   encoding information relating to a threshold value,
   wherein pixels in a valid region in the texture image and the depth image may be used for virtual view synthesis, and pixels in an invalid region in the texture image and the depth image are not to be used for virtual view synthesis, wherein when a pixel is included in the valid region, a depth value corresponding thereto is set equal to or greater than the threshold value, and wherein when a pixel is included in the invalid region, a depth value corresponding thereto is set less than the threshold value.

8. The apparatus of claim 7, wherein a pruned view image for the additional view image comprises an occluded region of other view images including the basic view image.

9. An image decoding apparatus for virtual view synthesis comprising one or more processors and one or more memory devices, wherein the one or more processors execute one or more commands of a program for virtual view synthesis stored in the one or more memory devices, wherein the one or more memory devices store the program for virtual view synthesis, wherein the one or more commands comprise decoding a texture image for a basic view image and an additional view image from a bitstream;

decoding a depth image for the basic view image and the additional view image from the bitstream; and synthesizing a virtual view on the basis of the texture image and the depth image, wherein pixels included in a valid region in the texture image and the depth image may be used for virtual view synthesis, while pixels included in an invalid region in the texture image and the depth image are not used for virtual view synthesis, and wherein whether a pixel is included in the valid region or the invalid region is determined by comparing a depth value corresponding thereto with a threshold value, the threshold value being determined based on information decoded from the bitstream, and wherein, when a depth value corresponding to a pixel is equal to or great than the threshold value, it is determined that the pixel is included in the valid region, and wherein, when a depth value corresponding to the pixel is less than the threshold, it is determined that the pixel is included in the invalid region.

10. The apparatus of claim 9, wherein during the virtual view synthesis, a pixel in the virtual view image is reconstructed using reconstructed pixels of multiple view images.

11. The apparatus of claim 9, wherein the commands further comprise determining priority orders of multiple view images, and wherein a weight assigning to each of the reconstructed pixels is determined based on the priority orders of the multiple view images.

* * * * *